US012674884B2

(12) United States Patent (10) Patent No.: US 12,674,884 B2
Hollaender et al. (45) Date of Patent: Jul. 7, 2026

(54) RADAR SYSTEM FOR SURROUNDINGS DETECTION OF A MOTOR VEHICLE

(71) Applicant: Robert Bosch GmbH, Stuttgart (DE)

(72) Inventors: Christian Hollaender, Waldbronn (DE); Gustav Klett, Moessingen (DE); Klaus Baur, Mietingen (DE); Lucian Iosub, Sindelfingen (DE); Michael Schoor, Stuttgart (DE); Ronny Ludwig, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 270 days.

(21) Appl. No.: 17/846,121

(22) Filed: Jun. 22, 2022

(65) Prior Publication Data

US 2023/0008080 A1 Jan. 12, 2023

(30) Foreign Application Priority Data

Jul. 8, 2021 (DE) ..................... 10 2021 207 205.4

(51) Int. Cl.
G01S 13/931 (2020.01)
(52) U.S. Cl.
CPC .................................. G01S 13/931 (2013.01)
(58) Field of Classification Search
CPC ..................................................... G01S 13/931
See application file for complete search history.

(56) References Cited

U.S. PATENT DOCUMENTS

| | | | | |
|---|---|---|---|---|
| 4,115,779 A | * | 9/1978 | Dantzler | ................ H01Q 1/084 |
| | | | | 343/882 |
| 5,707,192 A | * | 1/1998 | Vortriede | .............. F16B 37/041 |
| | | | | 411/546 |
| 12,013,480 B2 | * | 6/2024 | Hess | .................... H01Q 1/2283 |
| 2013/0045638 A1 | * | 2/2013 | Gui | .................... H01R 13/6471 |
| | | | | 439/660 |
| 2018/0090992 A1 | * | 3/2018 | Shrivastava | ............ H02J 50/20 |
| 2022/0059923 A1 | * | 2/2022 | Tanaka | .................... H01Q 1/38 |

FOREIGN PATENT DOCUMENTS

| | | | | | |
|---|---|---|---|---|---|
| CN | 112310620 A | * | 2/2021 | ................ | H01Q 1/36 |
| CN | 216436173 U | * | 5/2022 | ............ | H01R 11/05 |
| EP | 3095154 B1 | * | 3/2022 | .......... | H01Q 1/1214 |
| JP | 2012177665 A | | 9/2012 | | |
| JP | 2019178908 A | | 10/2019 | | |
| JP | 2021515186 A | | 6/2021 | | |
| JP | 2022066837 A | * | 5/2022 | .......... | G01S 13/931 |
| KR | 20150008765 A | | 1/2015 | | |

* cited by examiner

*Primary Examiner* — Vladimir Magloire
(74) *Attorney, Agent, or Firm* — NORTON ROSE FULBRIGHT US LLP

(57) ABSTRACT

A radar system for surroundings detection of a motor vehicle. The radar system includes an antenna for sending and/or receiving radar signals, a circuit board including at least one high-frequency component and an element for sending and/or receiving high-frequency signals. At least one fastening element is situated on/at the circuit board. The antenna includes at least one connecting element. The connecting element interacts with the fastening element in such a way that the antenna is fastenable and at the same time positionable on the circuit board by being pushed onto the at least one fastening element.

9 Claims, 4 Drawing Sheets

RADAR SYSTEM FOR SURROUNDINGS DETECTION OF A MOTOR VEHICLE

CROSS REFERENCE

The present application claims the benefit under 35 U.S.C. § 119 of German Patent DE 10 2021 207 205.4 filed on Jul. 8, 2021, which is expressly incorporated herein by reference in its entirety.

FIELD

The present invention relates to a radar system for surroundings detection of a motor vehicle, including an antenna for sending and/or receiving radar signals, a circuit board including at least one high-frequency component and an element for sending and/or receiving high-frequency signals.

BACKGROUND INFORMATION

Autonomous and semi-autonomous vehicles are controlled with the aid of at least one sensor system which detects the surroundings of the vehicle. Depending on the sensor data of the sensor system, for example, a parking space, a course of a road, other road users, or obstacles are recognized and/or travel trajectories are determined or corresponding control commands are calculated, the control commands being passed on to actuators in the vehicle. Not only comfort functions, such as an adaptive cruise control, but also safety functions, for example, emergency braking assistants, are implemented in vehicles. Radar sensors are used in particular. The essential advantage of such sensors is the direct measurement of physical variables and not the interpretation of images which are recorded, for example, using a video camera.

Radar sensors emit high-frequency radar beams via an antenna structure and receive the beams reflected at objects. The detected objects may be stationary or moving in this case. The distance and the direction (angle) in relation to the object may be calculated with the aid of the received radar beams. Moreover, the relative velocity of the object in relation to the radar sensor may be calculated. Typical radar sensors operate in a frequency range between 76 GHz and 81 GHz.

In addition to antennas based on circuit boards, waveguide antennas are also increasingly being used. The integration, i.e., the positioning and fastening of such waveguide antennas, is typically carried out with the aid of multiple screws. This type of integration generates significant costs during the installation.

SUMMARY

An object of the present invention is to refine a radar system for surroundings detection of a motor vehicle of the type mentioned at the outset in such a way that a cost-effective integration of a radar antenna, in particular a waveguide antenna, is possible involving small tolerances at the same time.

The above object may be achieved according to the present invention. In accordance with an example embodiment of the present invention:

at least one fastening element is situated on/at the circuit board, the antenna includes at least one connecting element, the connecting element interacts with the fastening element in such a way that the antenna is fastenable and at the same time positionable on the circuit board by being pushed onto the at least one fastening element.

The arrangement of a fastening element at/on the circuit board and an antenna including at least one connecting element, which interacts with the fastening element in such a way that the antenna is positionable and fastenable by being pushed on enables a robust radar sensor to be manufactured including an antenna which is installable in a simple manner.

According to one advantageous aspect of the present invention, it is provided that the at least one fastening element is a claw element, and the at least one connecting element is a pin, which is inserted into the spring-loaded claws of the claw element and held thereby. The pin on the antenna, or also referred to in short hereinafter as the antenna module, is thus inserted into the claw element and the claw element so to speak grips the pin, due to which a friction-locked connection results. This type of fastening enables a cost-effective and simple installation of the antenna without additional installation steps such as screws, adhesive bonding, or the like. Since the antenna module may be joined during the installation until it is flush, the tolerance chain from the coupling point of the HF wave from the circuit board into the waveguide is very small and is only restricted to shape deviations of the circuit board and the antenna. The tolerance compensation takes place via the guide length of the pin in the claw element.

According to one advantageous aspect of the present invention, the fastening element is situated in an opening in the circuit board.

The fastening element may be situated on the side of the circuit board facing away from the antenna.

However, it is also possible that the fastening element is situated on the side of the circuit board facing toward the antenna.

The fastening element may be fastened on/at the circuit board in greatly varying ways. One particularly advantageous aspect of the present invention provides that the fastening element is fastened on the circuit board with the aid of an SMD soldering process The fastening element may be made of one of the following materials: metal, plastic.

It is preferably provided that a plurality of fastening elements and a plurality of connecting elements are provided to fasten the antenna on the circuit board.

The antenna is preferably a waveguide antenna.

DETAILED DESCRIPTION OF EXAMPLE EMBODIMENTS

The present invention is explained by way of example hereinafter on the basis of the figures.

Figure 1:
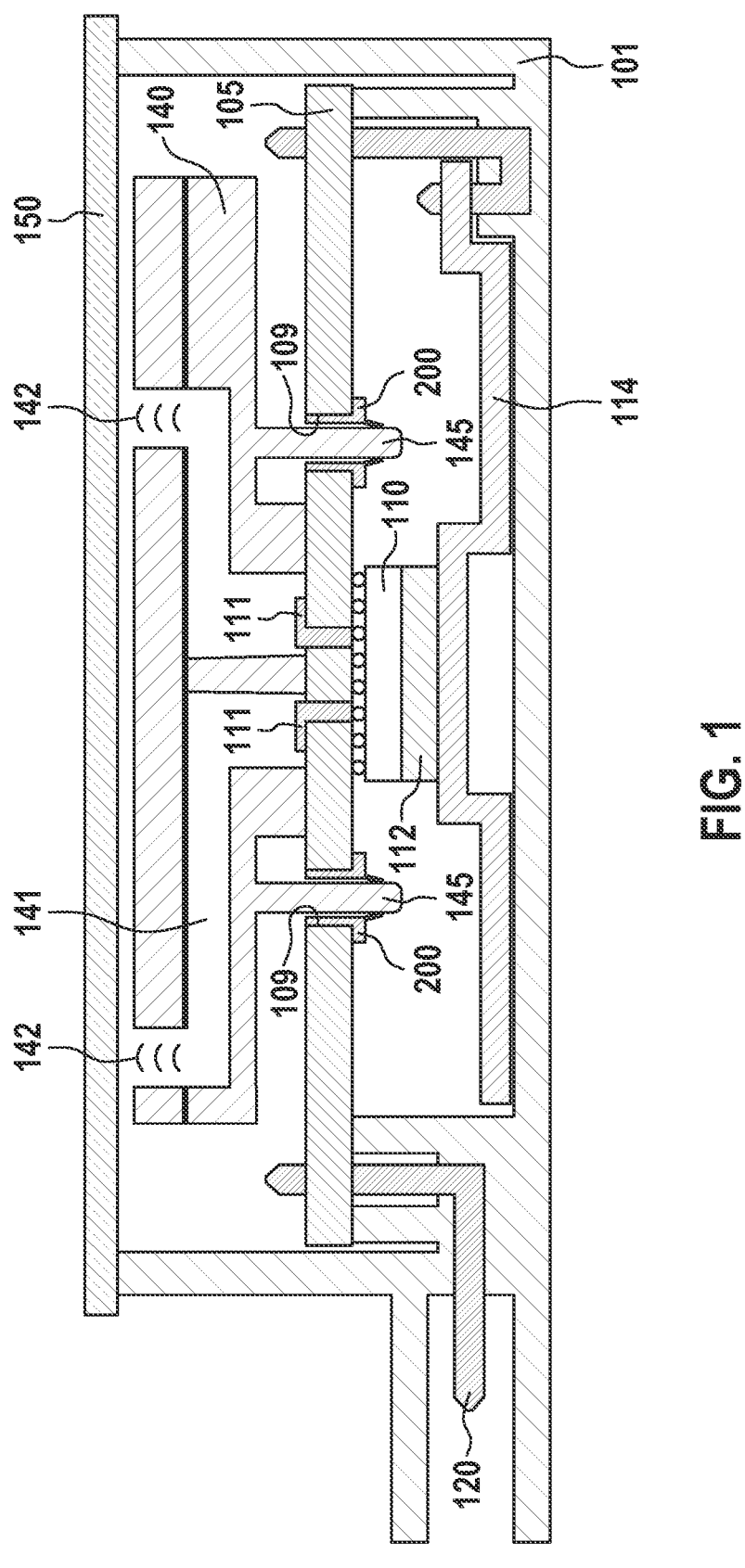
FIG. 1 schematically shows a side view of a radar system according to an example embodiment of the present invention.

FIG. 1 shows a radar system for surroundings detection of a motor vehicle in a lateral sectional view. This radar system includes a housing 101, in which a circuit board 105 is situated. A high-frequency component 110 is situated on circuit board 105, which is connected for heat dissipation to a heat sink 114 via a layer of thermal interface materials (TIM) 112. Plug elements 120 connect the control unit situated on the circuit board to externally accessible lines and the like. As is furthermore shown in FIG. 1, electrically conductive passages, for example, in the form of copper pads 111, may lead from high-frequency component 110 through corresponding openings (vias) situated in circuit board 105 into antenna 140. Antenna 140 is designed, for example, as a waveguide antenna, as schematically shown in FIG. 1. Antenna 140 is closed on the front side by a radome 150. Radar signals 142 are emitted to the outside via radome 150 by waveguide 141.

Figure 2:
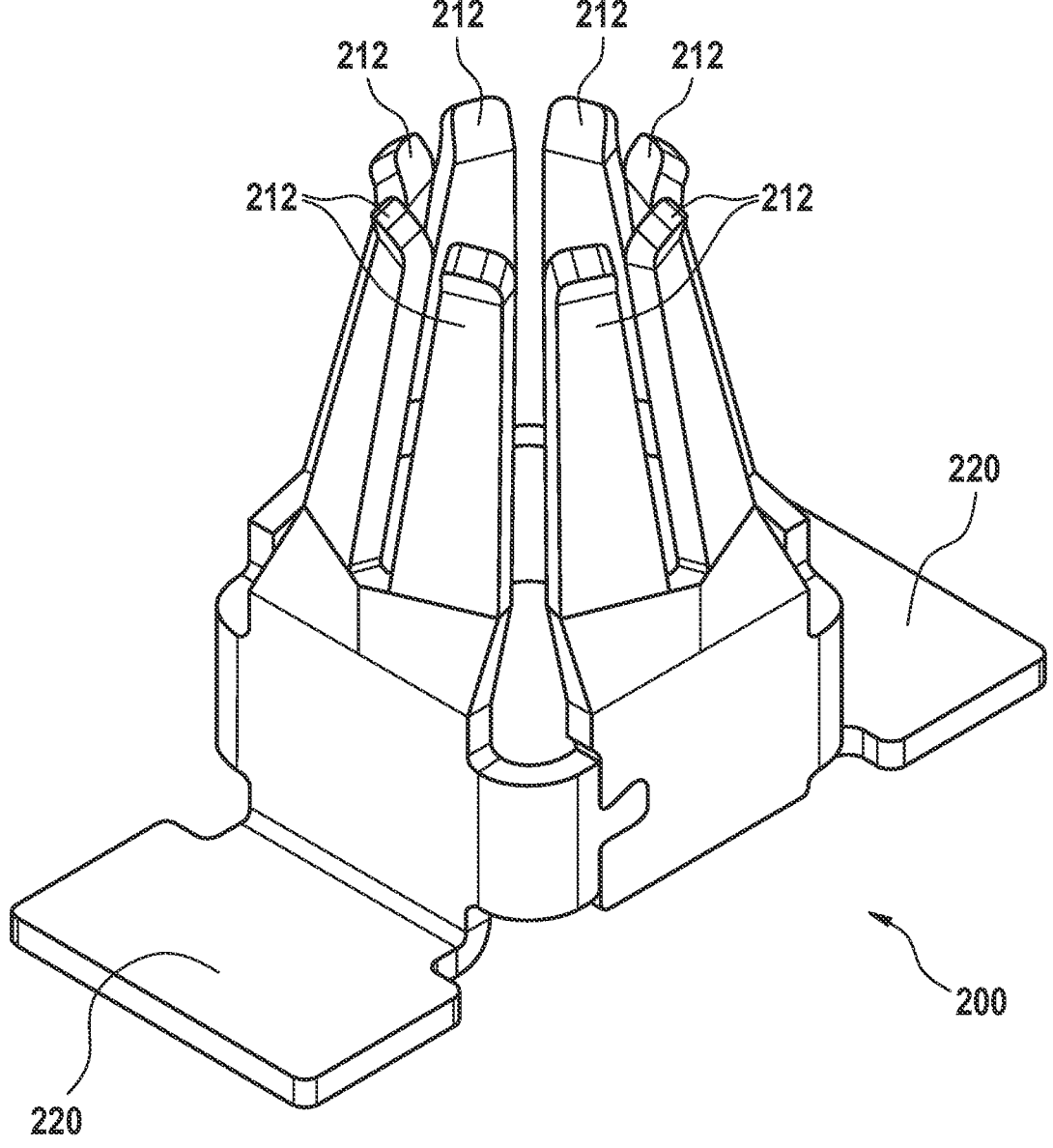
FIG. 2 schematically shows an isometric view of a fastening element according to an example embodiment of the present invention in the form of a claw element.

As may furthermore be apparent from FIG. 1, antenna 140 includes, for example, two pins 145. These pins 145 engage in fastening elements 200, which are situated in corresponding openings 109 in circuit board 105. These fastening elements 200 may be designed, for example, as shown in FIG. 2, as claw elements having claws 212 opening in the shape of a tulip in the direction of pins 145. Fastening elements 200 in the form of the claw elements may be fastened, for example, by an SMD soldering process via soldering surfaces 220 on circuit board 105. The fastening elements are placed on circuit board 105 in the SMD soldering process via pick-and-place and subsequently integrally connected to circuit board 105 in the reflow process.

The coupling of the HF wave from the circuit board may take place via the air (Launcher in Package) or, as shown in FIG. 1, via above-mentioned copper pads 111. The position of high-frequency component 110, also called HF chip, does not play a role, so that high-frequency component 110 may be positioned both on the antenna side and, as shown in FIG. 1, on the side facing away from antenna 140. In the case of the positioning on the side facing away from antenna 140, the HF wave is guided with the aid of the mentioned vias and, for example, copper pads 111 through circuit board 105. In principle, holes in circuit board 105 would also be possible here, through which the wave is emitted directly from the antenna package.

Figure 3A:
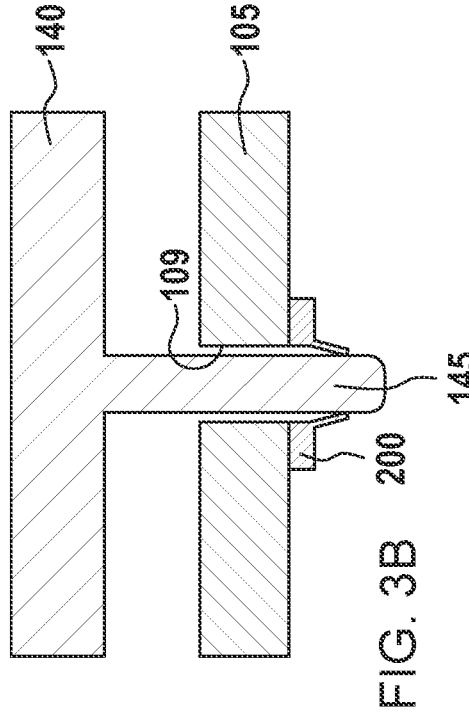
FIGS. 3A through 3D show various options for situating a fastening element according to example embodiments of the present invention on a circuit board.
Figure 3B:
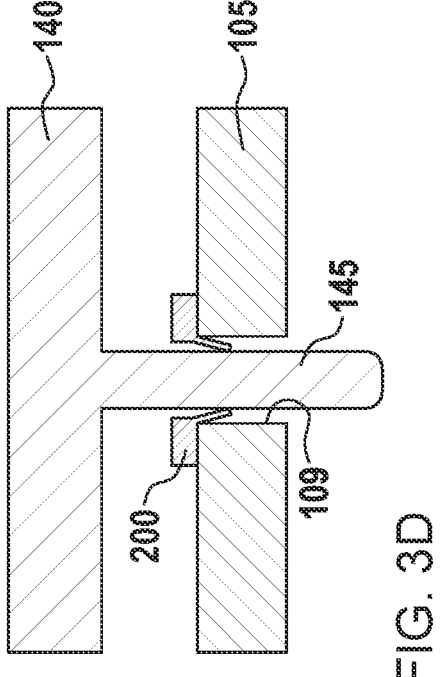
Figure 3C:
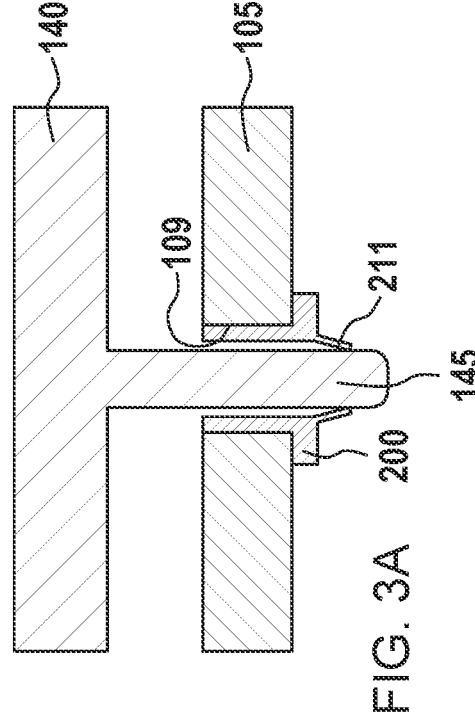
Figure 3D:
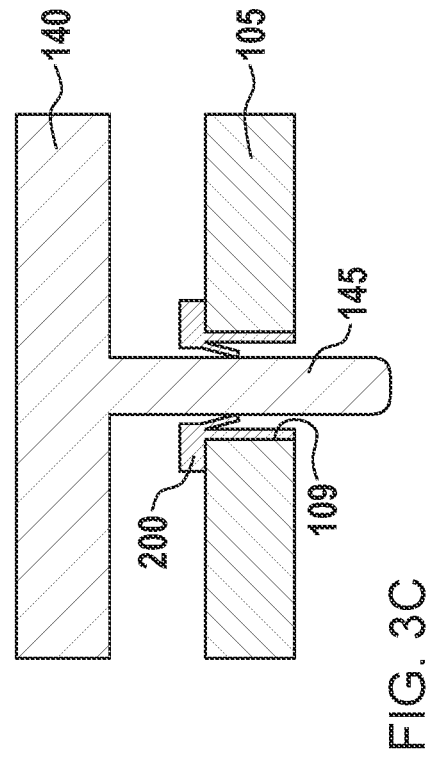

Different variants of the fastening of fastening element 200 at circuit board 105 are schematically shown in FIGS. 3A-3D. As shown in FIGS. 3A and 3B, fastening elements 200 may be fastened in corresponding openings 109 in circuit board 105 on the side of circuit board 105 facing away from antenna 140, for example, with the aid of the mentioned SMD soldering technology. The specific embodiment shown in FIG. 3A differs from the specific embodiment shown in FIG. 3B in that in FIG. 3A, the fastening element is inserted into opening 109 of circuit board 105 and thus forms a metallic path. This is not the case in the specific embodiment shown in FIG. 3B. Fastening element 200 is seated here on the surface of circuit board 105 and pin 145 engages in corresponding claws 212 of fastening element 200 on the side of circuit board 105 facing away from antenna 140. In the specific embodiments shown in FIGS. 3C and 3D, fastening element 200 is situated on the side of circuit board 105 facing toward antenna 140, the specific embodiment shown in FIG. 3C again showing a fastening element 200, which engages in opening 109 and thus forms a conductive channel in opening 109 in which pin 145 is guided. The specific embodiment shown in FIG. 3D, in contrast, dispenses with such an electrically conductive channel engaging in opening 109, which guides fastening pin 145.

Figure 4B:
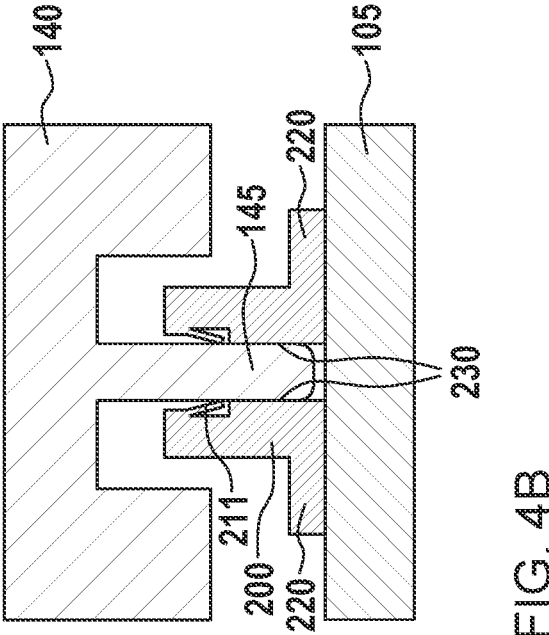
FIGS. 4A through 4B show other options for arranging a fastening element according to example embodiments of the present invention on a circuit board.
Figure 4A:
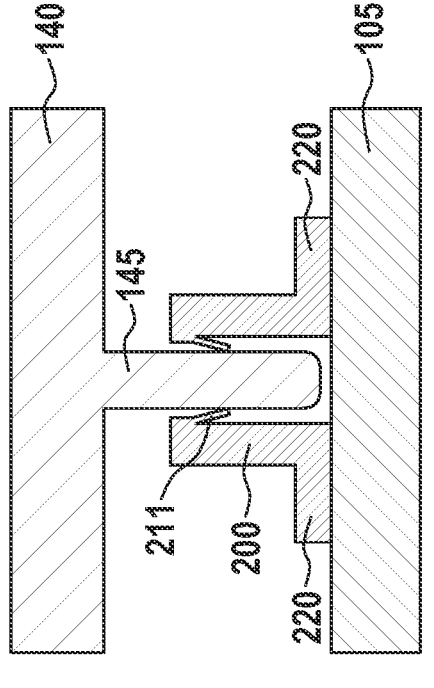

Other specific embodiments of the fastening of antenna 140 on a circuit board 105 are shown in FIG. 4A and FIG. 4B. In these specific embodiments, an opening in circuit board 105 is omitted. Fastening element 200 is fastened, for example, using an SMD soldering process on the upper side of circuit board 105. In this case, on the side of circuit board 105 facing toward antenna 140. The specific embodiment of claw element 200 including claws 211 shown in FIG. 4A does not include a guide of pin 145, whereas the specific embodiment shown in FIG. 4B includes a guide 230 of pin 145 on the side facing away from claws 211 and facing toward circuit board 105.

The advantage of the above-described radar system for surroundings detection of a motor vehicle is that antenna 140 may be installed in a very simple manner at/on circuit board 105. The positioning accuracy in the construction axis (z plane, in the figures this corresponds to the direction from circuit board 105 toward antenna 140) is achieved in the installation process by joining waveguide antenna 140 flush with circuit board 105. The resulting grips of pins 145 with claw elements 211 ensure a fixed seat of waveguide antenna 140 on circuit board 105.

Fastening element 200 itself may be made of plastic or metal or another material.

What is claimed is:

1. A radar system for surroundings detection of a motor vehicle, comprising:

an antenna assembly that includes (I) an antenna configured at least one of as an emitter from which radar signals are emitted out of the radar system into a surrounding environment and as a receiver via which radar signals are captured into the radar system and (II) at least one pin that is integrally formed with or fixedly connected to the antenna;

a circuit board that has a surface that extends in a first direction and that faces a surface of the antenna in a second direction that is perpendicular to the first direction;

at least one high-frequency component arranged on the circuit board;

a high-frequency signal conveyor arranged at least one of on and in the circuit board; and at least one fastener;

wherein:

each of the at least one fastener includes a base that is fixed to the circuit board and a respective plurality of prongs that extend in the second direction from first ends of the prongs that are connected to the base to second ends of the prongs which are free of the base so that they can be shifted radially inward and outward relative to the base;

each of the at least one pin extends in the second direction from the surface of the antenna towards the circuit board so that the respective pin is held by friction-fit within the respective plurality of prongs of a respective one of the at least one fastener, the friction-fit being by a spring-loading of the second ends of the respective plurality of prongs radially towards one another; and the holding of the at least one pin by the friction-fit mechanically fastens the antenna to the circuit board and is caused by a sliding of the at least one pin into the prongs of the at least one fastener.

2. The radar system as recited in claim 1, wherein the at least one fastener extends through an opening in the circuit board.

3. The radar system as recited in claim 1, wherein the at least one fastener is attached to the circuit board on a side of the circuit board facing away from the antenna.

4. The radar system as recited in claim 1, wherein the fastener is attached to the circuit board on a side of the circuit board facing toward the antenna.

5. The radar system as recited in claim 1, wherein the fastener is soldered to the circuit board using an SMD soldering process.

6. The radar system as recited in claim 1, wherein the fastener is made of one of the following materials: metal, plastic.

7. The radar system as recited in claim 1, wherein the at least one fastener includes a plurality of fasteners and the at least one pin includes a plurality of pins.

8. The radar system as recited in claim 1, wherein the antenna is a waveguide antenna.

9. The radar system as recited in claim 1, wherein the at least one pin extends from a face of the antenna that faces towards the circuit board, and, in a direction towards the face of the antenna, tips of the prongs, which are at the second ends of the prongs, taper radially outward opposite to a direction of the spring-loading of the prongs.

* * * * *